United States Patent

Nakanishi et al.

[19]

[11] Patent Number: 6,104,507
[45] Date of Patent: Aug. 15, 2000

[54] IMAGE DISPLAY APPARATUS HAVING A COMMUNICATION FUNCTION

[76] Inventors: Hiroyuki Nakanishi; Koichi Tanaka; Asao Watanabe; Shingo Akiyoshi, all of c/o Canon Kabushiki Kaisha 3-30-2, Shimomaruko, Ohta-ku, Tokyo, Japan

[21] Appl. No.: 08/209,226

[22] Filed: Dec. 22, 1992

Related U.S. Application Data

[63] Continuation of application No. 07/438,009, Nov. 20, 1989, abandoned.

[30] Foreign Application Priority Data

Nov. 28, 1988 [JP] Japan ................... 63-302037
Nov. 28, 1988 [JP] Japan ................... 63-302038
Oct. 5, 1989 [JP] Japan ................... 1-261874

[51] Int. Cl.$^7$ ................... H04N 1/32; H04N 1/00
[52] U.S. Cl. ................... 358/468; 358/400; 358/434; 358/440; 379/100
[58] Field of Search ................... 358/400, 401, 358/402, 403, 404, 405, 406, 407, 434, 435, 436, 437, 438, 439, 440, 468; 379/100

[56] References Cited

U.S. PATENT DOCUMENTS

| | | | |
|---|---|---|---|
| 3,914,771 | 10/1975 | Lunde et al. | 346/74.2 |
| 4,100,552 | 7/1978 | Muto et al. | 346/162 |
| 4,419,697 | 12/1983 | Wada | 358/440 |
| 4,423,439 | 12/1983 | Watanabe et al. | 358/451 |
| 4,587,568 | 5/1986 | Takayama et al. | 358/497 |
| 4,591,921 | 5/1986 | Nakajima | 358/400 |
| 4,607,289 | 8/1986 | Kurokawa | 358/402 |
| 4,646,160 | 2/1987 | Iizuka et al. | 379/100 |
| 4,698,688 | 10/1987 | Ochi et al. | 358/408 |
| 4,788,564 | 11/1988 | Ochiai | 346/153.1 |
| 4,819,078 | 4/1989 | Tadokoro et al. | 358/400 |
| 4,884,146 | 11/1989 | Yatsunami | 358/400 |
| 5,239,385 | 8/1993 | Ejiri | 358/434 |

FOREIGN PATENT DOCUMENTS

| | | | |
|---|---|---|---|
| 54-053915 | 4/1979 | Japan . | |
| 58-138171 | 8/1983 | Japan | 358/439 |
| 62-231558 | 10/1987 | Japan | 379/100 |
| 63-105544 | 5/1988 | Japan | 358/400 |

*Primary Examiner*—Thomas D. Lee

[57] ABSTRACT

An image display apparatus has a communication function which includes an image display for displaying image data and a communication unit for communicating image data and control information with another station. The apparatus includes a controller for controlling the communication unit such that it sends image data displayed on the image display to the other station in response to predetermined control information from the other station.

36 Claims, 11 Drawing Sheets

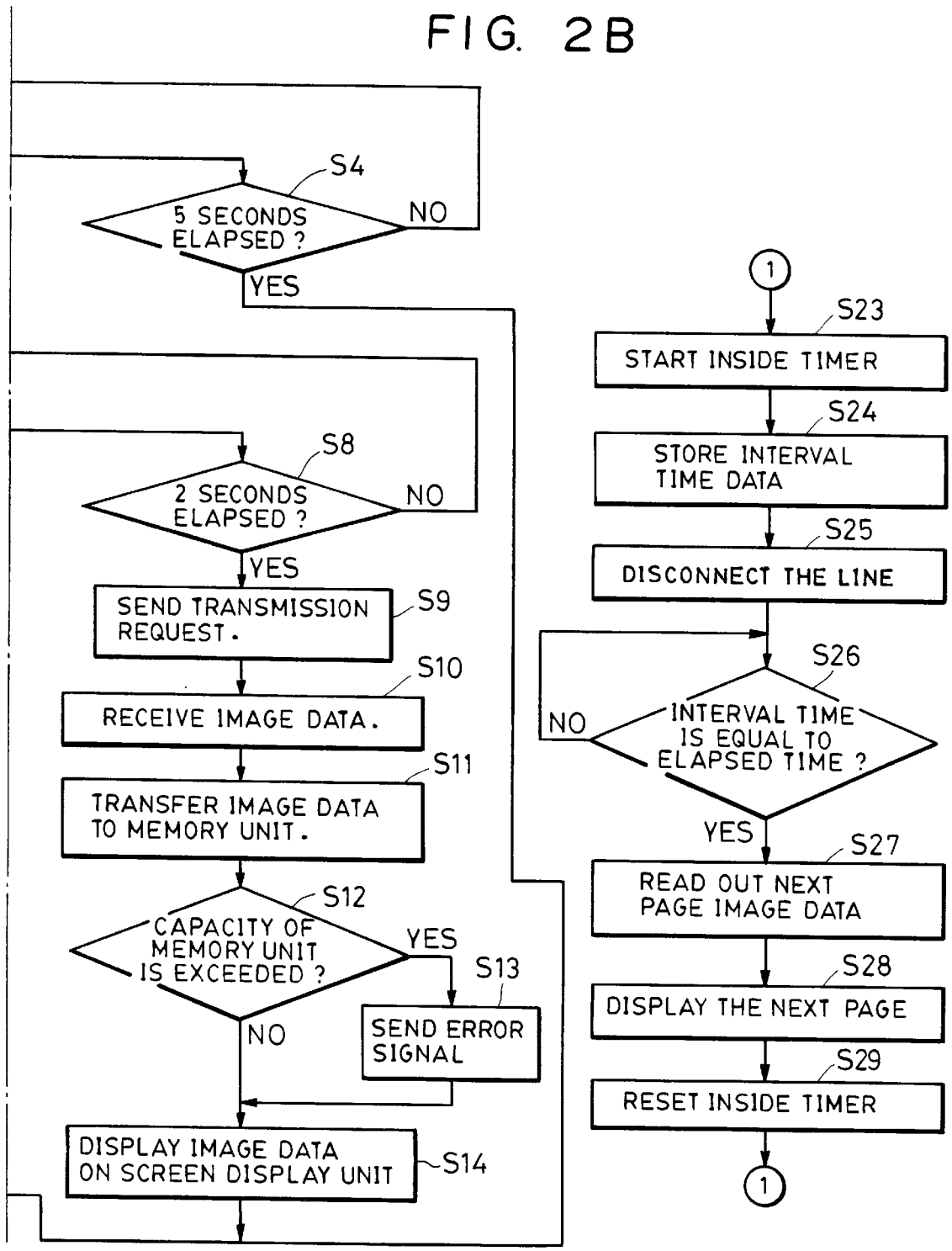

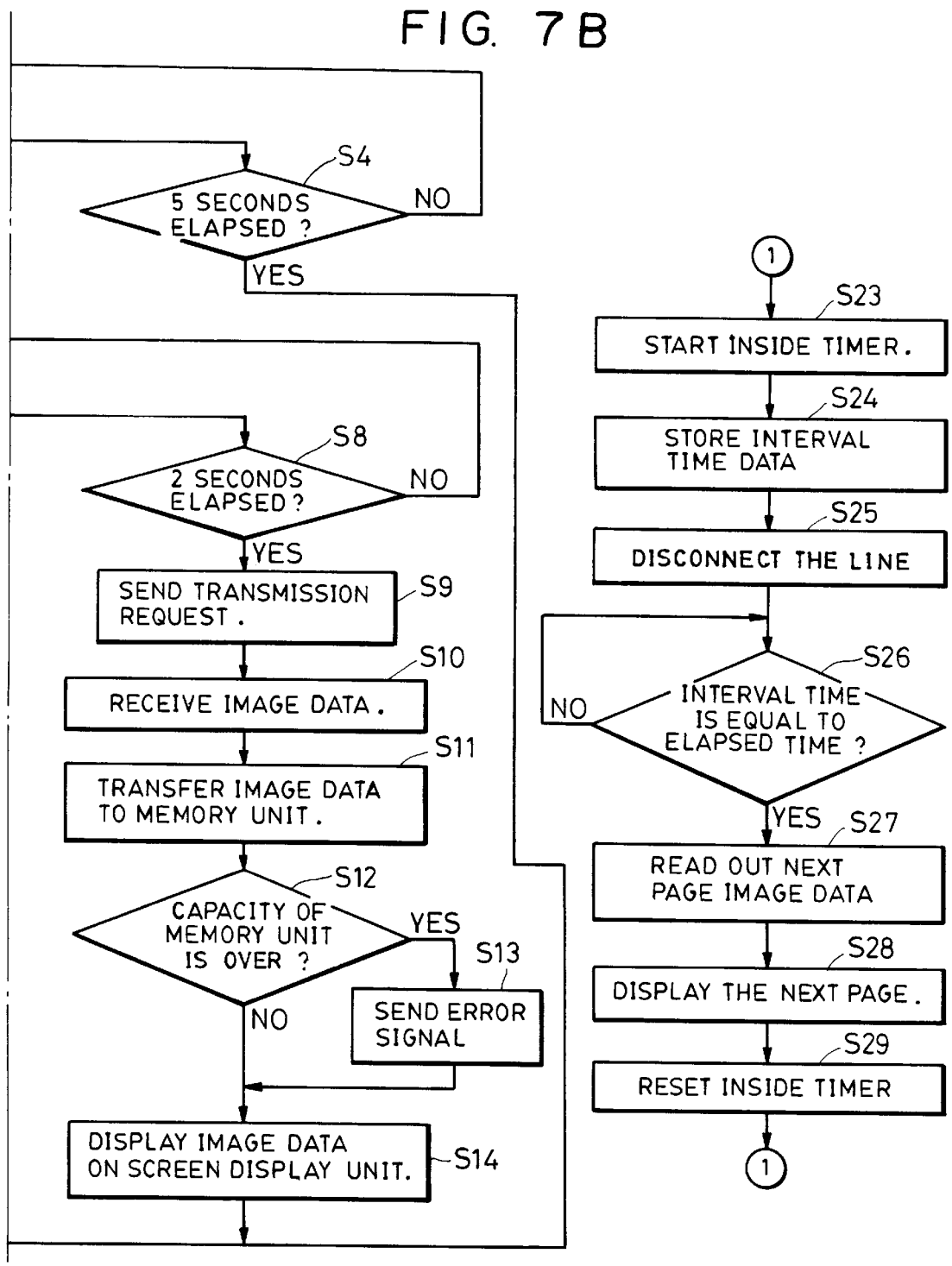

| # | CONTENTS OF ERRORS |
|---|---|
| 1 | RESERVED ( UNDECIDED ) |
| 2 | DOOR OF SCREEN PANEL IS OPEN. |
| 3 | RECORDING VOLTAGE IS ABNORMAL. |
| 4 | MOTOR OF DEVELOPER IS OUT OF ORDER. |
| 5 | CLEANER IS OUT OF ORDER. |
| 6 | SHEET TRANSPORTING MOTOR IS OUT OF ORDER |
| 7 | SENSOR IS OUT OF ORDER |
| 8 | MISCELLANEOUS ERRORS |
| 9 | RESERVED ( UNDECIDED ) |
| 0 | NORMAL CONDITION |

IMAGE DISPLAY APPARATUS HAVING A COMMUNICATION FUNCTION

This application is a continuation of application Ser. No. 07/438,009, filed Nov. 20, 1989, now abandoned.

BACKGROUND OF THE INVENTION

1. Field of the Invention

The present invention relates to an image display apparatus having a communication function.

2. Background

One conventional image display apparatus is disclosed in the Japanese Laid Open Patent Specification Sho 63(1988)-18384, which corresponds to the U.S. Pat. No. 4,788,564, issued Nov. 29, 1988.

This conventional display apparatus is explained briefly as follows, referring to FIG. 5.

This apparatus 108 has a display belt 109, on which an image is formed, which is endless and whose surface is white. The display belt 109 is supported by a pair of rollers 110 and 111 disposed vertically such that the belt 109 is able to move parallel to a display part 112. An image forming part 113 is also provided to form images on the belt 109 electrostatically with conductive magnetic toner by using a method, for example, as disclosed in U.S. Pat. No. 3,194,771, which discloses how to form an image with conductive magnetic toner. The magnetic toner T is transported to a recording electrode 116 on a surface of a non magnetic cylinder 115 in response to rotation of a rotating magnet 114. The recording electrode 116 is driven by a driving device 118 driven in turn by a display image signal from an image input device 117. When the driving device 118 applies a predetermined voltage, then the magnetic toner T is attached to the display belt 109 and thereby the image is formed.

The above-mentioned image display apparatus is operated by an operator who supplies image data to be displayed by controlling an image reader, a personal computer, or the like. Therefore, an operator must be near by the display apparatus.

The present inventors have considered how an operator can send image data via a facsimile communication line from a distant place to the display apparatus to display image data. Such a facsimile apparatus is disclosed in Japanese Laid Open Publication Sho54 (1979)-53915. An operator, however, who has sent image data in this way cannot confirm which image data is displayed, nor discriminate whether displayed image data should be erased or replaced or not.

Therefore, it is preferable that a distant operator be able to recognize which image is displayed on the display apparatus without a special apparatus.

Further, in the case where the apparatus can display an image from a distant station by using any method, any of the operators can change the displayed image innocently or mischievously unless the operator is limited. Therefore, it is preferable to avoid such mischief.

In the case where an operator wants to change an image to be displayed, it is also a problem if the operator has to order from the remote location every time.

SUMMARY OF THE INVENTION

A purpose of the present invention is to provide a novel image display apparatus having a communication function which overcomes the above mentioned shortcomings.

One aspect of the present invention is to provide an image display apparatus having a communication function, which includes an image display for displaying image data, means for communicating image data and control information with another station, and means for controlling the communicating means such that the communicating means sends image data displayed on the image display to the other station in response to a predetermined kind of control information from the other station. Thereby, an operator at the distant other station can confirm the image data displayed on the image display.

Another aspect of the present invention is to provide an image display apparatus which includes means for communicating image data and control information including an identification signal, an image display for displaying image data received by the communication means, and means for controlling whether the communicating means permits reception of the image data in response whether the received identification signal is correct or not. Thereby, anyone who does not know the identification signal can be prohibited from displaying any image data through mischief.

Another aspect of the present invention is to provide an image display apparatus having a communication function, which includes a memory for storing image data, an image display for displaying image data stored in the memory, means for communicating control information with another station, and means for changing image data displayed on the image display to other image data stored in the memory in response to a predetermined kind of control information received by the communicating means. Thereby, an operator at the distant station can easily change image data displayed on the image display to new image data.

Another aspect of the present invention is to provide an image display apparatus having a communication function, which includes an image display for displaying image data, means for communicating image data and control information and having a polling function sending image data displayed on the image display in response to a polling request from another station, and means for controlling the communicating means such that when an identification signal from the another station is correct, said communicating means sends the image data displayed on said image display in response to the polling request without using a non standard procedure of the Group 3 facsimile apparatus. Thereby, an operator at the distant station can confirm the image data displayed on the image display without special receiving apparatus.

However, in the case that the above mentioned display apparatus is used for an unattended advertising display, if the display apparatus has a malfunction, an operator at the distant station cannot recognize the malfunction, so that the operator may request a change in image data or send image data to be displayed without recognizing the malfunction. Therefore, the unattended display apparatus is not used effectively.

Therefore, another purpose of the present invention is to provide an image display apparatus having a communication function, which includes means for communicating image data and control information with another station, an image display for displaying image data, means for detecting an operating condition of the image display, and means for controlling the communicating means such that it sends image data displayed on the image display and the operating condition detected by said detecting means. Thereby, an operator at the distant station can easily confirm not only the image data displayed on the display but the operating condition of the display.

The foregoing summary of certain advantageous features of the invention is provided in order that the detailed description of the embodiments thereof that follows may be better understood, and in order that the present contribution to the art may be better appreciated. There are, of course, additional features of the invention that will be described in that detailed description with reference to the accompanying drawing. Those skilled in the art will appreciate that the conception upon which this disclosure is based may readily be utilized as a basis for designing other structures or methods for carrying out the purposes of the invention. It will be understood that the claims are to be regarded as including such other constructions and methods as do not depart from the spirit and scope of the invention.

BRIEF DESCRIPTION OF THE DRAWINGS

FIGS. 2A and 2B are flow charts illustrating a communication procedure of the display apparatus;

FIGS. 7A and 7B are flow charts illustrating a communication procedure of the second embodiment;

DETAILED DESCRIPTION OF THE PREFERRED EMBODIMENT

Figure 1:
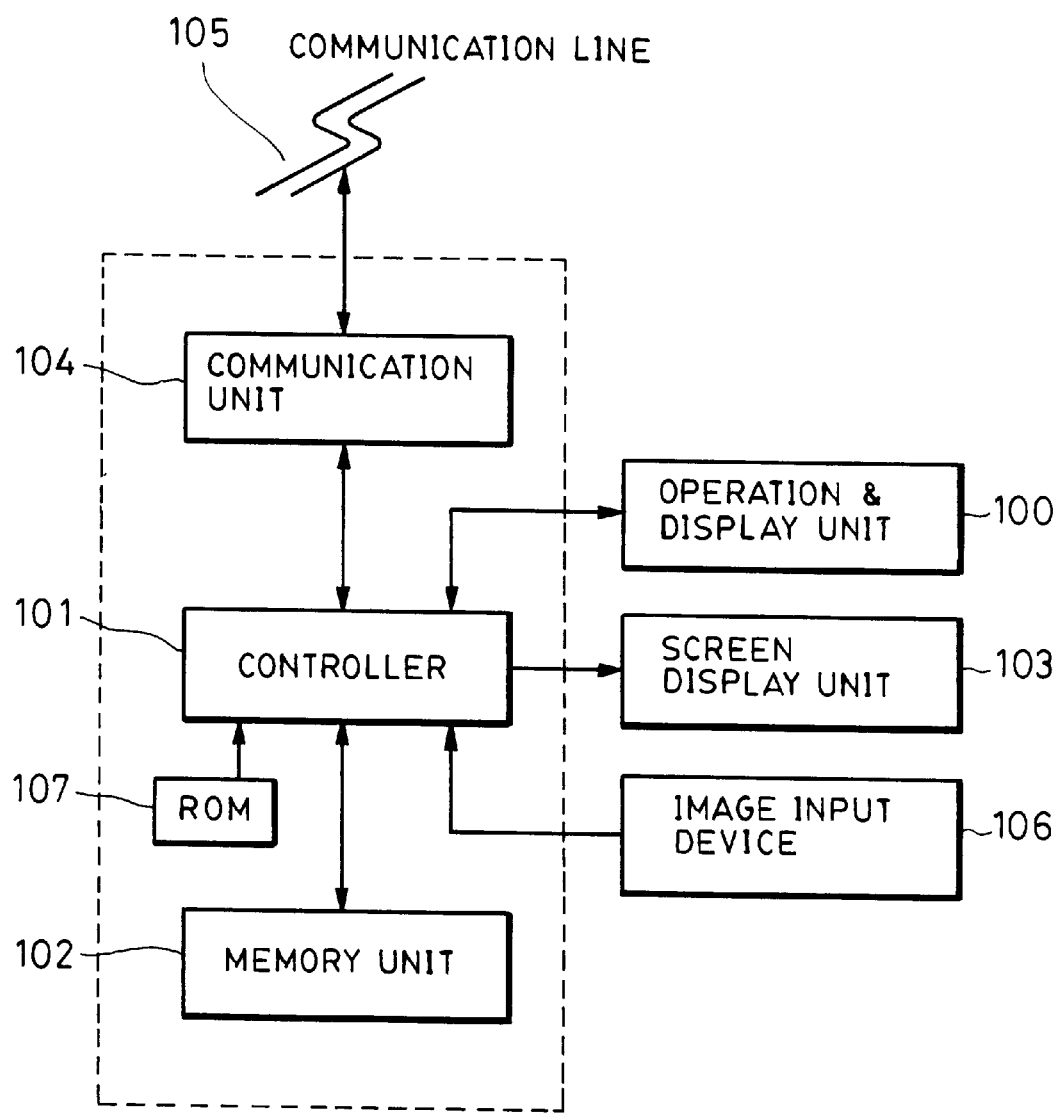
FIG. 1 is a block diagram showing an entire image display apparatus of a first embodiment of the present invention.

FIG. 1 shows a block diagram of an image display apparatus having a communication function.

Figure 2A:
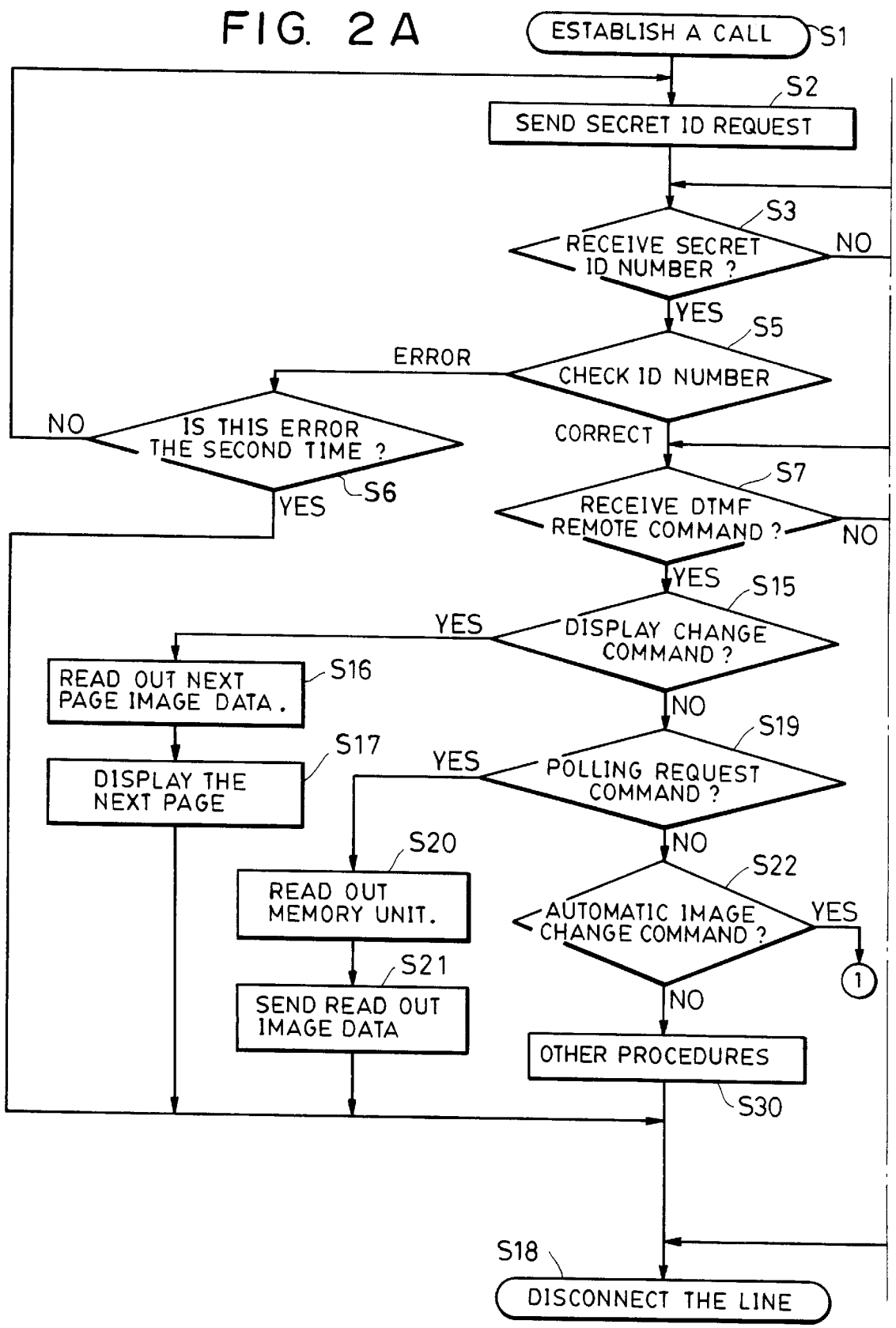
Figure 3:
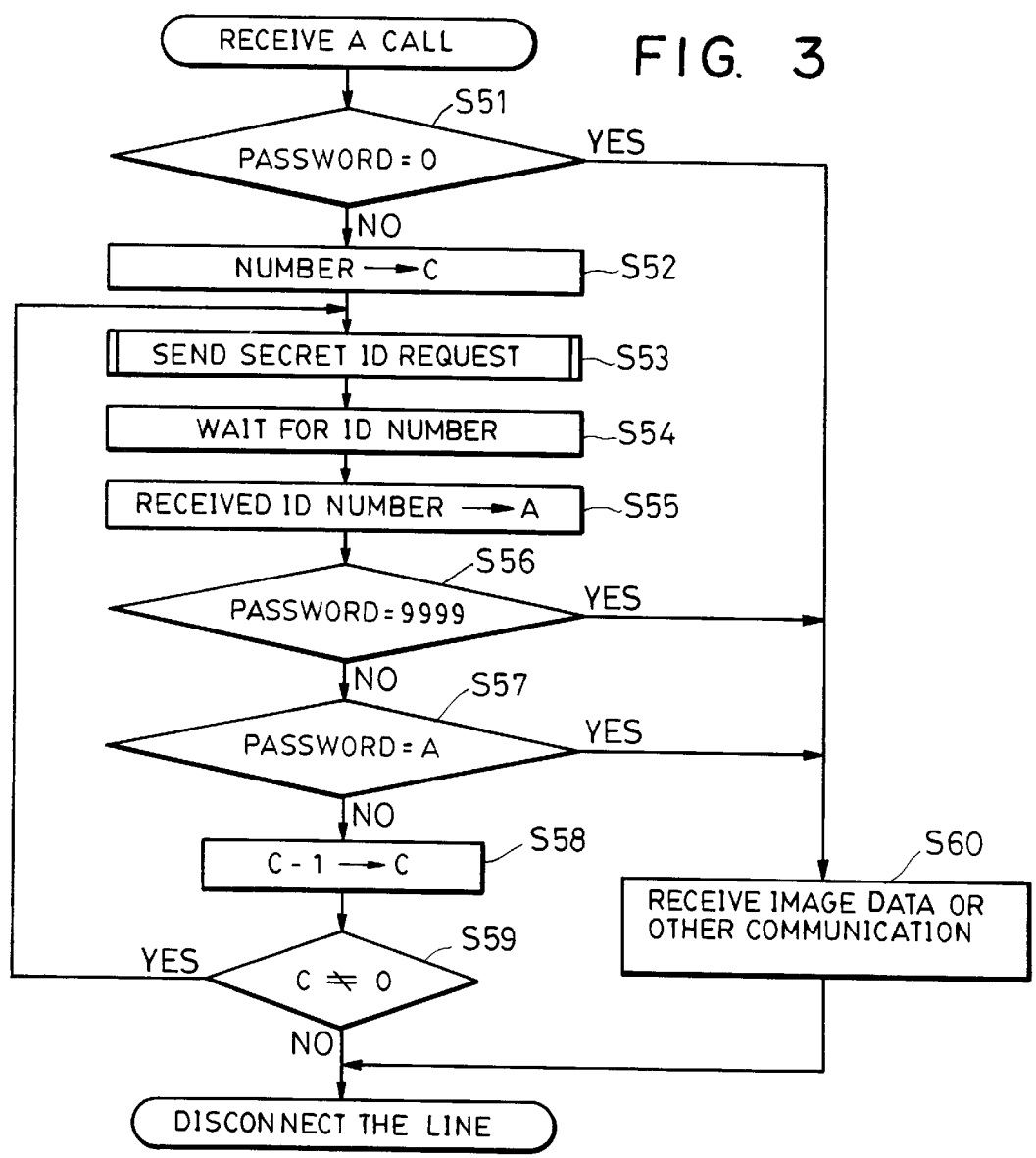
FIG. 3 is a flow chart illustrating a procedure for checking an identification signal.
Figure 3:
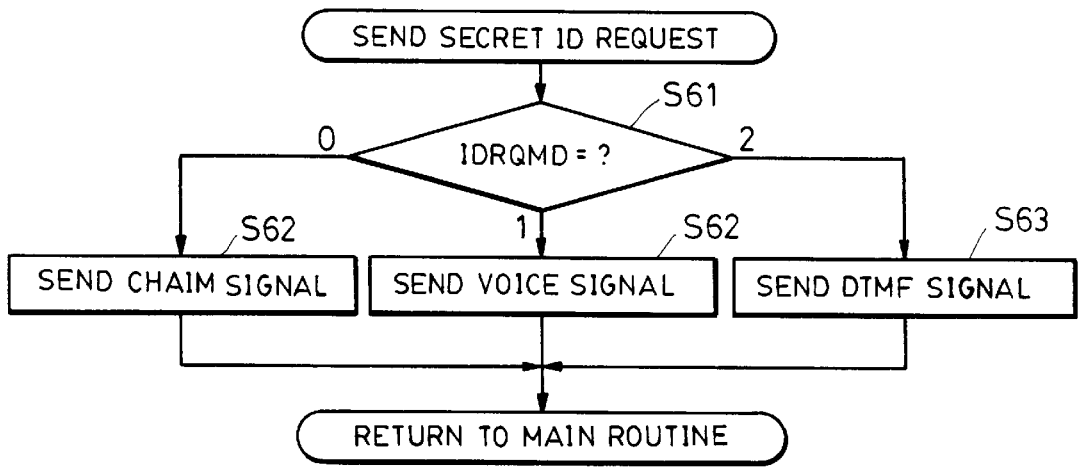
Figure 5:
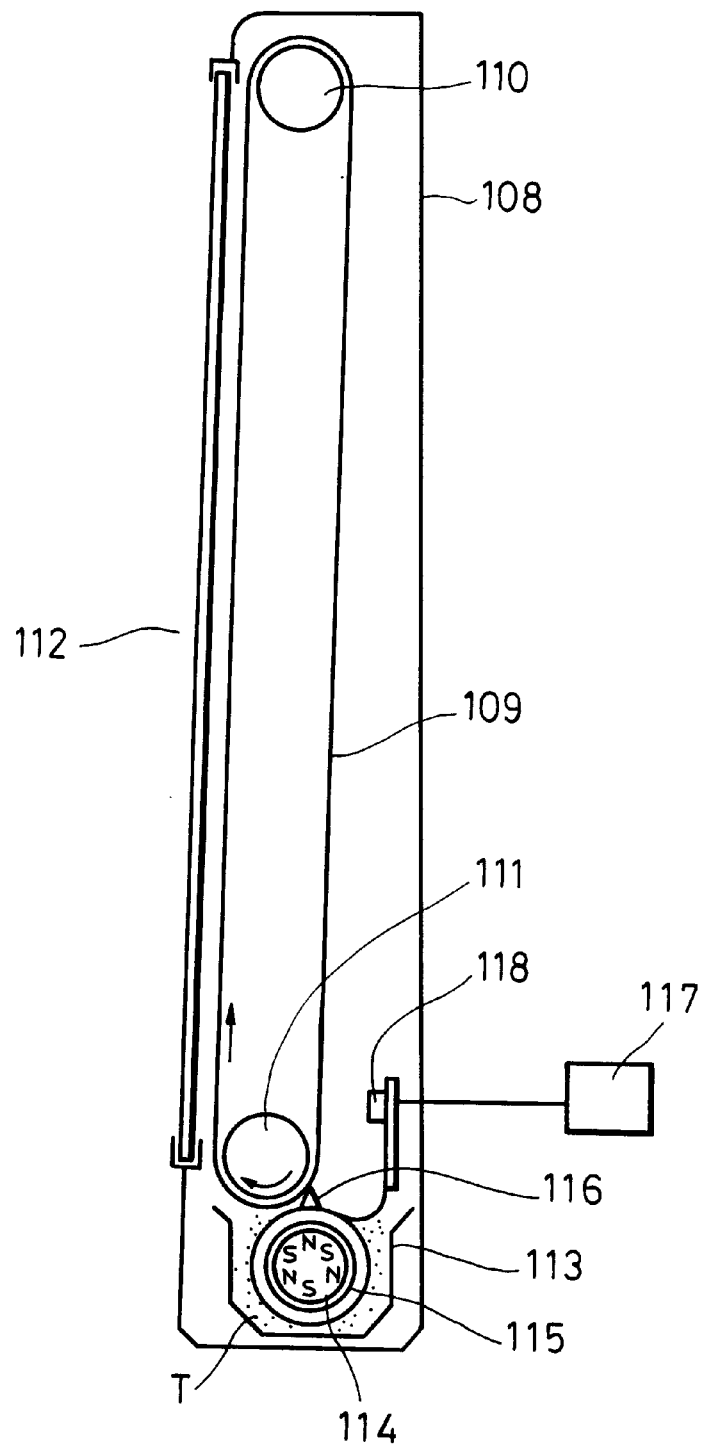
FIG. 5 is a cross section of a conventional screen display unit.

The display apparatus includes an operation and display unit 100, a memory unit 102 for storing image data to be displayed and information for display control. The memory unit 102 can store image data corresponding to a plurality of pages. A screen display unit 103 is also provided for displaying images, and the unit 103 is structured as shown in FIG. 5. The apparatus also includes a communication unit 104 for receiving image data from a communication line 105 and for transmitting image data stored in the memory unit 102 to outside apparatus via the line 105, and the communication unit 104 is structured by a conventional facsimile apparatus. The memory unit 102 stores image data received from the line 105 in a compressed and coded condition. The line 105 can be a general public line, an excluding line, or the like. The apparatus also has a controller 101 for controlling the entire apparatus, an image input device 106, e.g. an image reader, for inputting image data and a ROM (Read Only Memory) 107 for storing a control program of the controller 101 as shown in FIGS. 2 and 3.

Referring to the flowchart of FIG. 2, an operation of the display apparatus will be explained as follows.

First of all, when a calling facsimile apparatus calls this apparatus via the line 105 to establish a call (S1), this apparatus sends a secret identification request signal (S2).

Unless a secret identification number is received within five seconds, the controller 101 disconnects the line and ends the communication in steps S2, S3 and S18.

On the other hand, if the secret identification number is received within five seconds of the request signal (S3, S4), the controller 101 discriminates whether the identification number is correct or not (S5). If it is not correct, the controller 101 sends the request signal again in step S2.

If the identification number is not correct again, the controller 101 disconnects the line and ends communication in steps S6 and S18.

Thereby, this display apparatus accepts a call only from a specified distant station which knows the secret identification number to avoid mischievous interference by unauthorized distant stations.

If the identification number is correct, the controller 101 waits for a remote command having DTMF (Dual Tone Multi Frequency) signals for two seconds in steps S7 and S8. When the remote command is not received in two seconds, the controller 101 discriminates that the other apparatus is in a image data transmission mode, and sends a transmission request having a "bleep" sound for requesting image transmission (S9). In step S10, this apparatus enters an image reception mode, and receives image data from the calling apparatus by the communication unit 104 while checking for errors in received image data. The received image data is transferred and stored into the memory unit 102 in step S11, and simultaneously is transferred to the screen display unit 103 to display one page of the receiving image data in step S14. Then the controller 101 disconnects the line and ends communication in step S18.

If the memory unit 102 cannot store all the received image data, the controller 101 sends an error signal to the calling station in steps S12 and S13.

When the remote command is received, the controller 101 analyzes the remote command. If the received remote command is discriminated as a display change command in step S15, the controller 101 causes the memory unit 102 to read out image data for the next page, and transfers the read image data to the screen display unit 103 in step S16. The display unit 103 changes the display to the next p age in step S17, and the controller 101 disconnects the line and ends communication in step S18.

If the received remote command is discriminated as a polling request command for confirming the display image which is now displayed in step S19, the controller 101 reads out all t he image data in the memory unit 102 from the data which is now displayed on the screen display unit 103 in step S20, and causes the communication unit 104 to send the read image data to the calling station via the communication line 105 in step S21. Then the controller 101 disconnects the line 105 and ends communication in step S18 as well.

Thus, the calling station can request this station to send the image data by the DTMF polling request command without using the non standard procedure of T30 of CCITT recommendation. Generally, the non standard procedure is different among manufacturers. But, in this case, a calling station which is made by another manufacturer is able to send a polling request if an operator knows the identification number. That is, checking the secret identification number in step 55 is a substitute for checking a polling ID for the polling operation defined in T30, so that this station can shift to the image transmission mode without carrying out the non standard procedure of T30.

Thereby, an operator of the distant calling station can confirm the image data displayed on the screen display unit 3 by receiving the image data with its own facsimile apparatus.

The controller 101 controls the starting address of the image data which is currently displayed, so that in the polling operation the controller can send the image data currently displayed first. Therefore, an operator at the distant calling station can recognize quickly which image data is currently displayed among plural pages of image data.

If the controller 101 discriminates that the remote command is an automatic image change command in step S22, the controller 101 starts an internal timer in step S23, and stores data showing interval time for display, which is received with a DTMF signal as well as the remote command, into the memory unit 102 in step S24. Then the controller 101 disconnects the line 105 in step S25. The controller 101 compares the interval time with a count value of the internal timer in step S26, and if they coincide, the controller 101 reads out the next image data from the memory unit 102 and causes the display unit 103 to display the next image data in steps S27 and S28. Then the internal timer is reset and restarted in step S29.

Thus, the image data stored in the memory unit 102 is displayed cyclically with a predetermined interval.

When the controller 101 discriminates that the received remote command is another kind of command, the controller 101 carries out a procedure in response to that command in step S30, and disconnects the line 105.

FIG. 3 shows a detailed flowchart illustrating retrieval of the secret identification number in FIG. 2.

Referring to FIG. 3, the controller 101 has internal registers PASSWORD, IDRQMD, NUMBER, A and C. The secret identification number is set by switches on the operation and display unit 100 and is stored in the register PASSWORD. In this embodiment, if the predetermined secret identification number is set by an operator, the apparatus can be designed such that the controller 101 does not retrieve the identification number, or such that the controller 101 allows the image reception without limitation by any identification numbers entered from a calling station.

For example, if "0" is set in the register PASSWORD, the controller 101 does not retrieve the secret identification number, and if "9999" is set in the register PASSWORD, the controller 101 allows the image reception by any identification number entered from a calling station.

When a call is received from a calling station and "0" is set in the register PASSWORD, the controller 101 does not send the secret identification request signal to the calling facsimile station, and enables reception of image data or other communication in steps S51 and S60.

If the register PASSWORD stores a number other than "0", the controller sends the secret identification request signal in step S53. When the secret identification number is received from the calling station, the received number is stored into the register A in steps S54 and S55.

When the register PASSWORD stores "9999", the controller 101 starts the image reception mode or other communication modes regardless of whether any identification number is received in step S60.

Further, in this embodiment, this apparatus can send various kinds of secret identification request signals to a calling facsimile station, i.e., a chime signal, a DTMF signal and a voice signal. One of them is selected by the value of the register IDRQMD, which is set by switches on the operation and display unit 100. If "0" is set in the register IDRQMD, the controller 101 selects the chime signal as the request signal. If "1" is set the controller 101 selects the DTMM signal, and if "2" is set the human voice signal is selected. The chime signal and the human voice are stored in the memory unit 102 as voice data, and they are sent via the communication unit 103 and the line 105 to the calling facsimile apparatus or telephone set.

If the register PASSWORD stores other than "9999" or "0", the controller 101 discriminates whether the received number is coincident with the number stored in the register PASSWORD. If it is, the controller 101 allows the image reception, but if not the controller 101 decrements the value stored in the register C in step S58. Then the controller 101 discriminates whether the value of the register C is "0" or not in step S59. In step S52, the controller 101 loads a value of the register NUMBER storing maximum permissible number of errors in entering the secret identification number to the register C.

If the value of the register C becomes "0", the controller 101 discriminates that the operator at the calling station does not know the secret identification number, and disconnects the line. If not, the controller 101 sends the request signal again.

Figure 4:
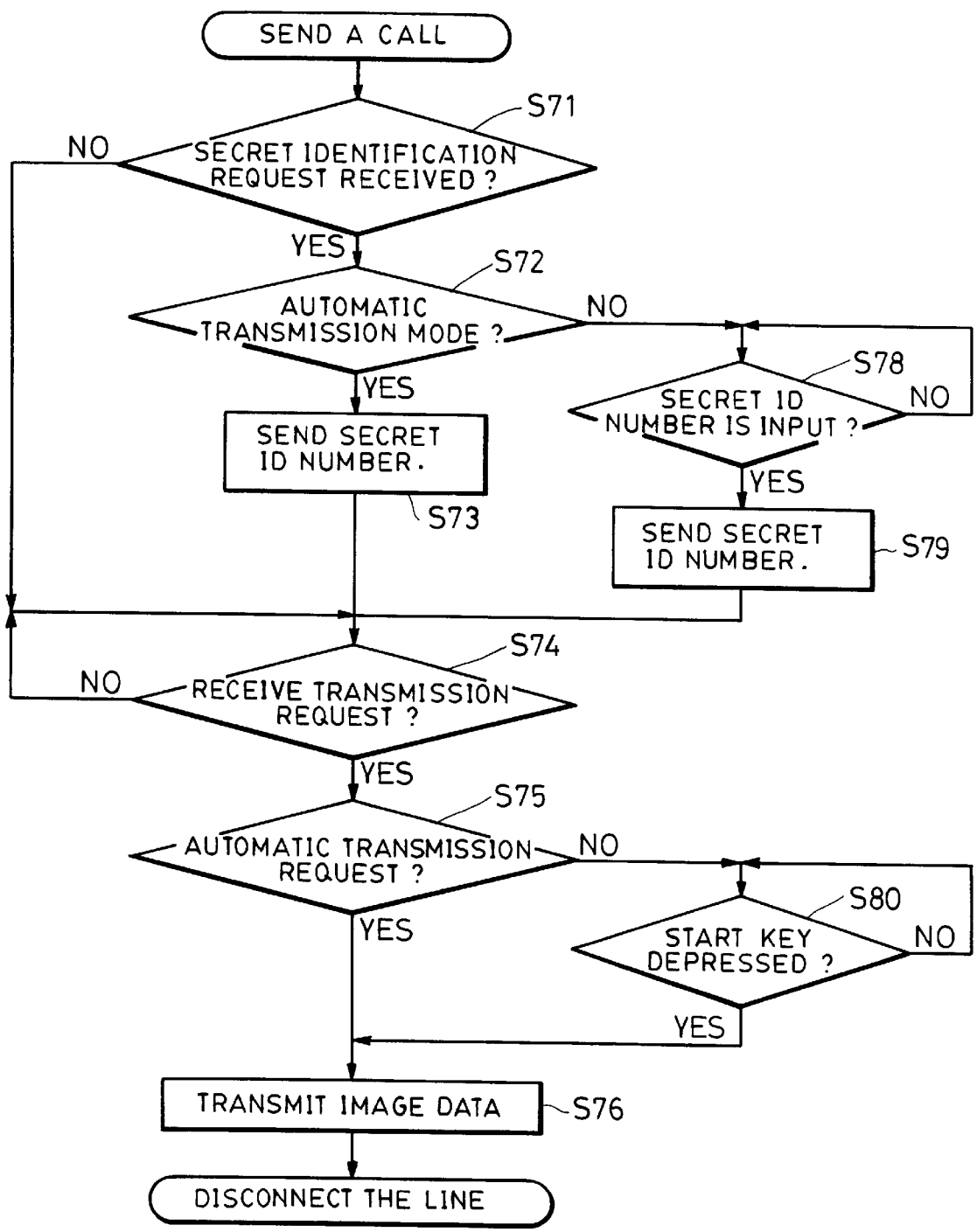
FIG. 4 is a flow chart of a sending procedure of another distant facsimile apparatus.

FIG. 4 illustrates a program of a calling facsimile apparatus.

When the calling station receives the secret identification number request signal in step S71, the calling station discriminates whether the calling station is set in an automatic transmission mode in step S72. If it is, the calling station reads out a prestored secret identification number and sends that number to the image display apparatus in step S73.

On the other hand, if the calling station is set in a manual transmission mode, the calling station waits for the identification number to be entered by an operator in step S78. Upon entry of the identification number the calling station sends the number to the image display apparatus in step S79.

When the calling station receives the transmission request from the display apparatus in step S74, the calling station sends image data to be displayed automatically in step S76 under the automatic transmission mode, and sends the image data on actuation of a transmission start key by the operator in step S80 under the manual transmission mode.

Another embodiment of the present invention which is applied to an unattended advertising display is explained as follows.

Figure 6:
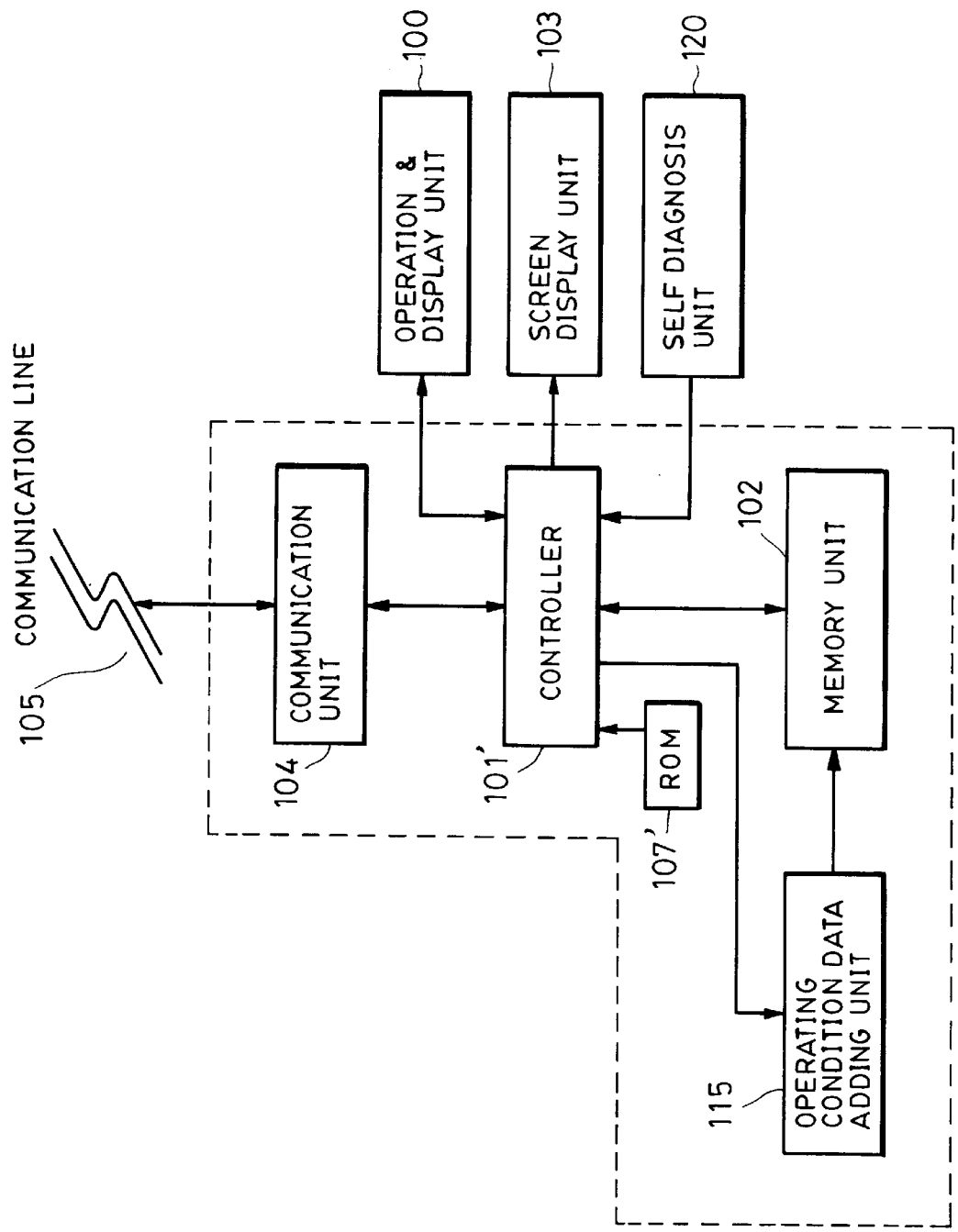
FIG. 6 is a block diagram showing an entire image display apparatus of a second embodiment of the present invention.
Figure 7A:
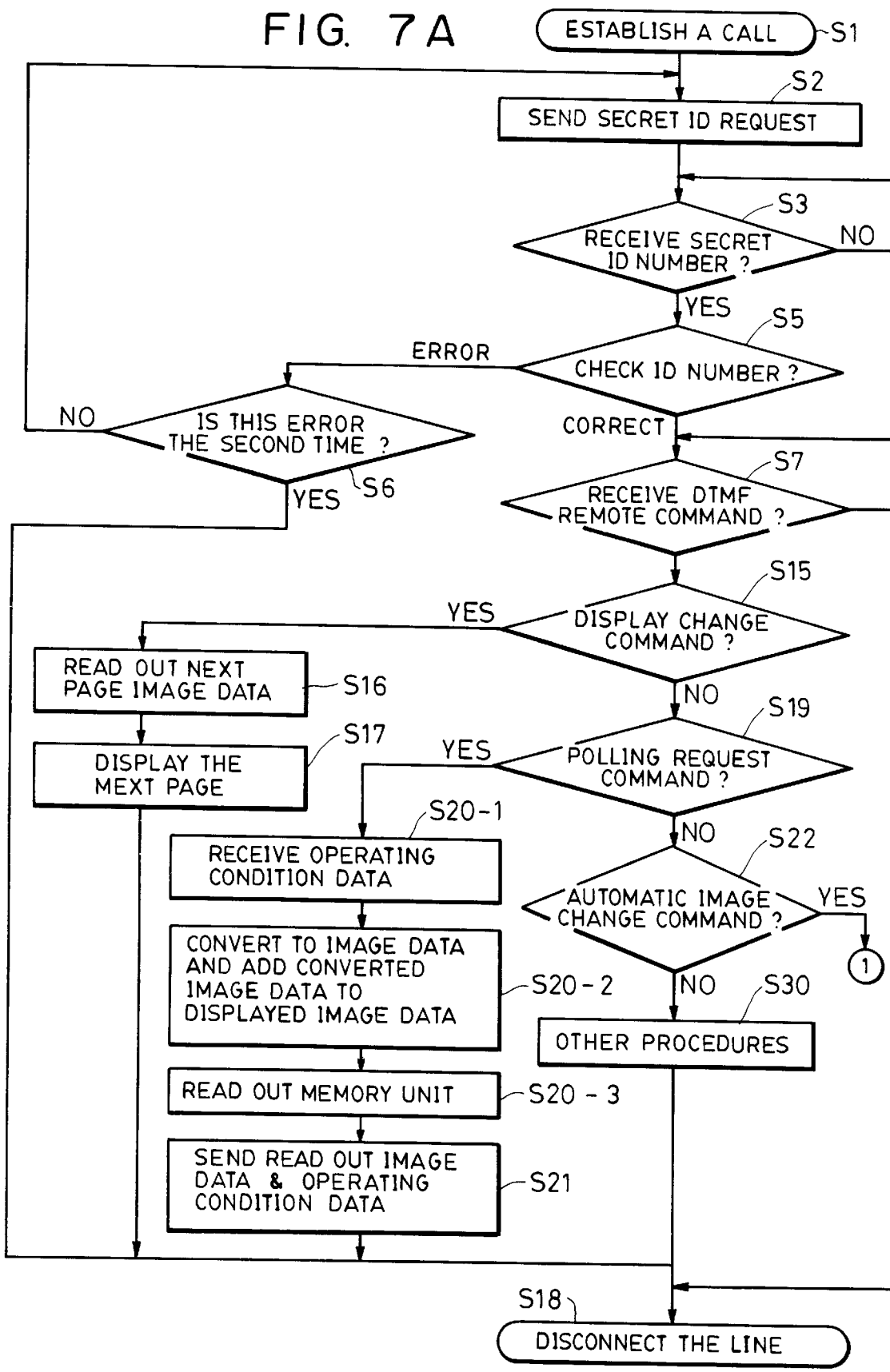

FIG. 6 shows a block diagram of the second embodiment wherein the elements having same functions as in FIG. 1 have same identification numbers. In FIG. 6, a controller 101' controls the entire display apparatus, a data adding unit 115 writes operating condition data of the display apparatus into the memory unit 102, and a ROM 107' stores a control program of the controller 101' as shown in FIG. 7. A self diagnosis unit 120 is also provided for diagnosing the screen display unit 103 and for detecting an abnormal part.

It will be explained how the apparatus works referring to FIG. 7. In FIG. 7, the steps having the same operations in FIG. 2 have same step numbers, and their explanations are omitted.

The operations in FIG. 7 different from those of FIG. 2 are operations when the remote command is a polling request command for confirming the image which now is displayed on the screen.

When the remote command is discriminated as the polling request command in step S19, the controller 101' reads out image signal corresponding to the image displayed on the screen display 103 in step S20-3. Simultaneously, the controller 101' receives the operating condition data from the self diagnosis unit 120, and sends the data to the data adding unit 115. The data adding unit 115 converts the received condition data to image data and adds the converted image data at the top of the read out image data from the memory unit 102 in step S20-2.

Then, the controller 101' sends the image data of the operating condition data and the displayed image data to the line 105 via the communication unit 104 while reading out the image data from the memory unit in step S21. After sending all the image data, the controller 101' disconnects the line and ends communication in step S18. If the screen display unit 103 does not display any image, the controller 101 sends only the image data of the operating condition.

Figure 8:
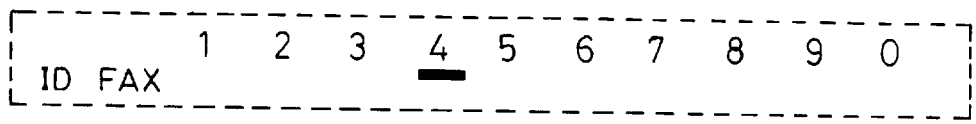
FIGS. 8(1) and 8(2) are drawings showing an example of operating condition data of the display apparatus.

FIG. 8(1) illustrates an example of the image data of the operating condition to be added on the image data. In this case, there is a mark at number 4, and this indicates that the display apparatus has a malfunction on a developing motor. FIG. 8(2) shows contents of malfunctions corresponding to numbers.

The self diagnosis unit 120 detects the operating condition of the screen display unit every predetermined period, e.g., three seconds.

Thus, as described above, an operator at the distant facsimile apparatus can receive the image data which is displayed on the screen display at that time and the operating condition of the display apparatus by a polling request. The image data of the operating condition is recorded on the top of a recording paper at the receiving side.

As well as in the first embodiment, the controller 101' administrates addresses of all the pages of the image data stored in the memory unit 102, so that the controller 101' can read out all the pages of the image data after reading out the image data displayed on the screen display 103 at the time of polling operation. The controller 101' sends all the pages of the image data with page numbers, and the operator at the receiving side can know all the pages of the image data stored in the memory unit 102.

In this embodiment, the operating condition data is converted to image data and the converted image data is sent. However, the operating condition data can be sent in code format and the calling station can convert the code format to image data.

Instead of the operating condition data being added to the image data read out from the memory unit during reading out, the operating condition data can be replaced by a part of the image data stored in the memory unit, and then the replaced image data and the rest of the image data can be sent.

The controller 101' detects malfunctions every three seconds in this embodiment, but the controller 101' may check for malfunctions every desired number of seconds. Alternatively, the controller 101' may check only when the polling request is received.

Further, the operating condition data above is recorded on the top of the recording paper, but it can be recorded on any appropriate blank space.

Figure 9:
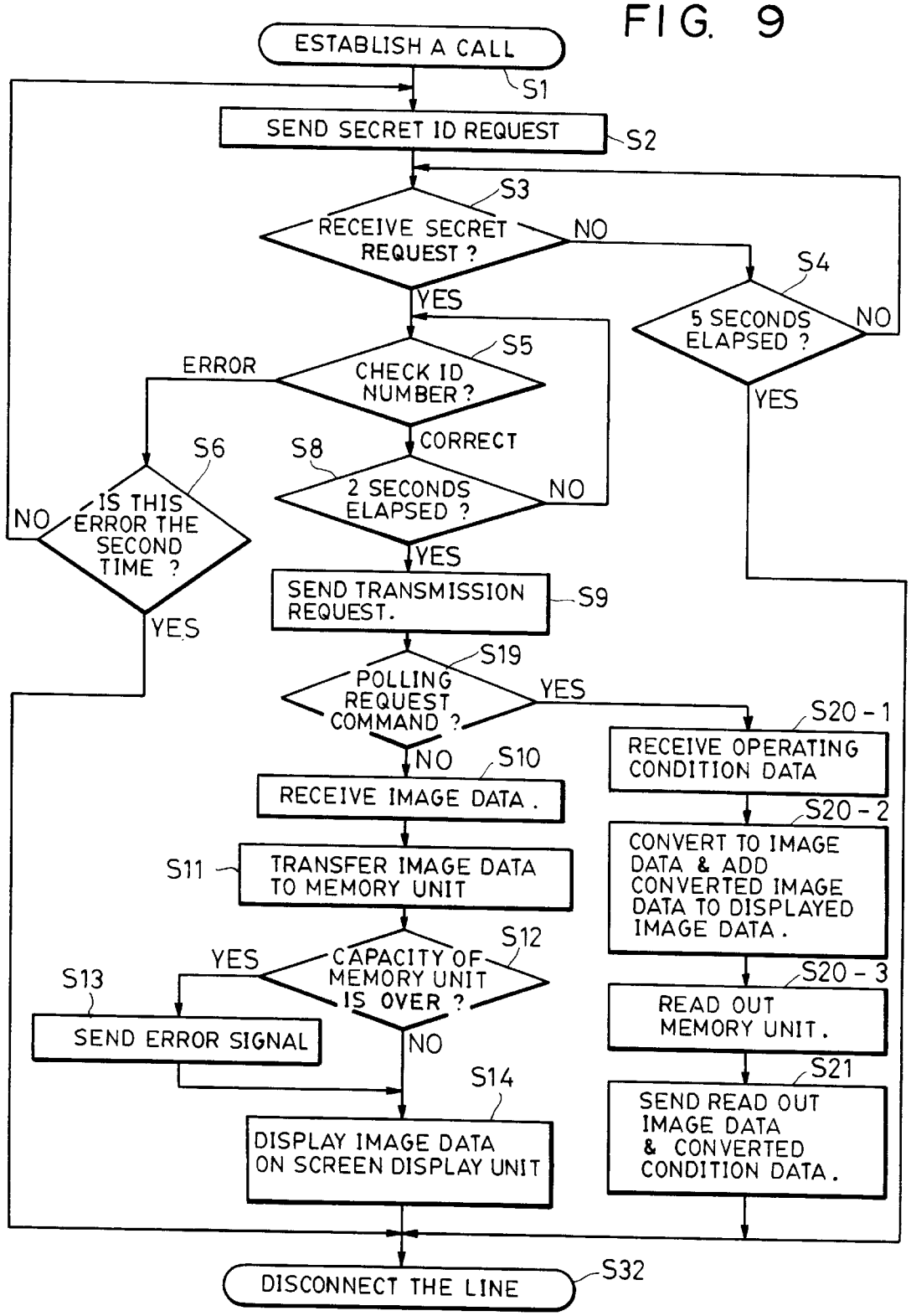
FIG. 9 is a control flow chart illustrating an image sending operation with a non standard procedure.

In the second embodiment as well as in the first embodiment, the display apparatus does not use the non standard procedure shown in T-30 of the CCITT recommendation, but carries out polling by the DTMF remote command. However, the non standard procedure can be used, and an example of operating software therefor is shown in FIG. 9. In FIG. 9, the same operations as in FIG. 7 have same step numbers, and their explanations are omitted.

As described above, the display apparatus sends not only the image data stored in the memory but the operating condition of the called station to the calling station when the polling request is received by the calling station. Therefore, an operator at the distant calling station is able to confirm the operating condition of the calling station as well as the image data stored in its memory or displayed on the screen. Thereby, the operator at the distant station can deal with malfunctions appropriately. For example, if the malfunction is not so serious, such as the door is open or the like, the operator can call the user of the display apparatus to close the door, and if the malfunction requires fixing, the operator can send a repair person.

Further, in this embodiment, the display apparatus informs the calling station that there is no malfunction by marking the number "0" as shown in FIG. 8, so that the operator at the distant calling station can easily confirm that the apparatus works ordinarily.

In the above mentioned embodiments, the remote command is sent from the facsimile apparatus, but other apparatus which can send a control signal like a DTMF signal can be applied to the present invention.

Further, in these embodiments, the screen display unit which maintains its display without power supply is used, but other displays such as a CRT display, a liquid crystal display, and the like can be used as the screen display.

Although particular embodiments of the present invention are herein disclosed for purposes of explanation, various modifications thereof, after study of this specification, will be apparent to those skilled in the art to which the invention pertains.

As described above, according to present invention, an operator at the distant station can confirm the image data displayed on the image display, and for anyone who does not know the identification signal can be prohibited from mischievously displaying image data.

Further, an operator at the distant station can easily change image data displayed on the display to new image data, can confirm the image data displayed on the image display without a specially featured receiving apparatus, and can easily confirm not only the image but the operating condition of the display. Therefore, even though the operator at the distant station orders a change in the image data to be displayed, the display will not maintain its display of old image data without recognizing its malfunction.

What is claimed is:

1. An image display apparatus having a communication function, comprising:

a memory for storing a plurality of image data;

an image display for displaying image data stored in said memory;

means for communicating image data and control information with a remote station through a communication line; and controlling means for reading out image data from said memory, displaying the readout image data on said image display and managing an address of said memory which stores the image data being displayed on said image display, wherein said controlling means reads out from said memory image data which corresponds to the image data being displayed on said image display on the basis of the managed address without influencing display operation of said image display in response to receiving by said communication means predetermined control information from a remote station, and controls said communication means to send the readout image data to the remote station.

2. An image display apparatus, according to claim 1, wherein said controlling means discriminates whether an identification signal received by said communicating means is correct or not, and if it is correct, said controlling means allows said communicating means to send the image data.

3. An image display apparatus, according to claim 1, further comprising means for detecting an operating condition of said image display, wherein said communicating means further sends the operating condition detected by said detecting means.

4. An image display device, according to claim 3, wherein the detected operating condition is sent to the other station with the image data displayed on the image display.

5. An image display apparatus, according to claim 1, wherein said memory stores other image data in addition to the image data displayed on the image display.

6. An image display apparatus, according to claim 5, wherein said communicating means sends the image data displayed on the image display and the other image data in response to receiving the predetermined kind of control information.

7. An image display apparatus, according to claim 1, wherein said image display maintains its display without power supply.

8. An image display apparatus having a communication function, comprising:
   a memory for storing image data;
   an image display for displaying image data stored in said memory;
   means for communicating control information with a remote station through a communication line; and
   means for changing image data displayed on said image display to other image data stored in said memory in response to predetermined control information sent from the remote station to said communicating means.

9. An image display apparatus, according to claim 8, wherein said changing means discriminates whether an identification signal received by said communication means is correct or not, and if it is correct, said changing means changes image data.

10. An image display apparatus, according to claim 8, wherein said image display maintains its display without power supply.

11. An image display apparatus having a communication function, comprising:
    a memory for storing image data;
    an image display for displaying image data stored in said memory;
    means for communicating control information with another station; and
    means for changing image data displayed on said image display to other image data stored in said memory in response to predetermined control information received by said communication means, wherein
       said changing means changes image data displayed on said image display to other image data stored in said memory every predetermined period.

12. An image display apparatus, according to claim 11, wherein said changing means changes a value of said predetermined period in accordance with the predetermined control information.

13. An image display apparatus according to claim 11, wherein said changing means discriminates whether an identification signal received by said communication means is correct or not, and if it is correct, said changing means changes the image data displayed on said image display.

14. An image display apparatus according to claim 11, wherein said image display maintains its display without power supply.

15. An image display apparatus having a communication function, comprising:
    an image display for displaying image data;
    means for communicating image data and control information and having a polling function for sending image data displayed on said image display in response to a polling request received from another station; and
    means for controlling said communicating means such that when an identification signal from the other station is correct, said communicating means sends the image data displayed on said image display in response to the polling request in a procedure distinct from a non standard procedure of Group 3 facsimile apparatus.

16. An image display apparatus, according to claim 15, further comprising means for detecting an operating condition of said image display, wherein said communicating means also sends the operating condition detected by said detecting means.

17. An image display apparatus, according to claim 15, further comprising a memory for storing image data displayed on said image display.

18. An image display apparatus, according to claim 15, wherein said image display maintains its display without power supply.

19. A method for operating an image display apparatus having a communication function, comprising the steps of:
    storing a plurality of image data in a memory;
    reading out the stored image data;
    displaying the image data read out from the memory on an image display;
    managing an address of the memory which stores the image data being displayed on the image display;
    receiving predetermined control information from a remote station through a communication line;
    reading out the image data in the memory which corresponds to the image data being displayed on the basis of the managed address without influencing display operation of the image display in response to receiving the predetermined control information from the remote station; and
    sending the readout image data to the remote station.

20. A method according to claim 19, further comprising the step of discriminating whether an identification signal received by the image display apparatus is correct or not, and if it is correct, sending the readout image data to the remote station.

21. A method according to claim 19, further comprising the step of detecting an operating condition of the image display, wherein the control information sent to the remote station includes the detected operating condition of the image display.

22. A method according to claim 21, further comprising the step of sending the detected operating condition to the remote station with the image data displayed on the image display.

23. A method according to claim 22, further comprising the step of storing other image data in addition to the image data displayed on the image display into the memory.

24. A method according to claim 23, further comprising the step of sending the image data displayed on the image display and the other image data in response to receiving the predetermined control information.

25. A method according to claim 19, further comprising the step of maintaining the display on the image display without power supply.

26. A method for operating an image display apparatus having a communication function, comprising the steps of:

storing image data into a memory;

displaying image data stored in the memory on an image display;

communicating control information with a remote station through a communication line; and changing image data displayed on the image display to other image data stored in the memory in response to predetermined control information sent from the remote station to the image display apparatus.

27. A method according to claim 26, further comprising the step of discriminating whether an identification signal received by the image display apparatus is correct or not, and if it is correct, changing the image data.

28. A method according to claim 26, further comprising the step of maintaining the display in the image display without power supply.

29. A method for operating an image display apparatus having a communication function, comprising the steps of:

storing image data in a memory;

displaying image data stored in the memory on an image display;

communicating control information with another station; and changing image data displayed on the image display to other image data stored in the memory in response to predetermined control information received by the image display apparatus, wherein the image data displayed on the image display is changed to other image data stored in the memory every predetermined period.

30. A method according to claim 29, further comprising the step of changing a value of a predetermined period in accordance with the predetermined control information.

31. A method according to claim 29, further comprising the step of discriminating whether an identification signal received by the image display apparatus is correct or not, and if it is correct, changing the image data displayed on the image display.

32. A method according to claim 29, further comprising the step of maintaining the display on the image display without power supply.

33. A method for controlling an image display apparatus having a communication function, comprising the steps of:

displaying image data on an image display;

communicating image data and control information having a polling function for sending image data displayed on the image display in response to a polling request received from another station; and when an identification signal from the other station is correct, sending the image data displayed on the image display in response with a polling request in a procedure distinct form a non-standard procedure of a Group 3 facsimile apparatus.

34. A method according to claim 33, further comprising the step of detecting an operating condition of the image display, wherein the detected operating condition is also sent to the other station.

35. A method according to claim 33, further comprising the step of storing image data displayed on the image display in a memory.

36. A method according to claim 33, further comprising the step of maintaining a display on the image display without power supply.

* * * * *

UNITED STATES PATENT AND TRADEMARK OFFICE
CERTIFICATE OF CORRECTION

PATENT NO. : 6,104,507
DATED : August 15, 2000
INVENTOR(S) : Hiroyuki Nakanishi et al.

It is certified that error appears in the above-identified patent and that said Letters Patent is hereby corrected as shown below:

Title page,
Item [56], References Cited, after "Primary Examiner…" insert the following:
-- *Attorney, Agent or Firm*, Fitzpatrick, Cella, Harper & Scinto --.
Item [73], Assignee, insert -- [73] Assignee:  Canon Kabushiki Kaisha,
Tokyo, Japan --.
Item [76], Inventor, "[76] Hiroyuki Nakanishi; Koichi Tanaka; Asao Watanabe; Shingo Akiyoshi, all of c/o Canon Kabushiki Kaisha 3-30-2, Shimomaruko, Ohta-ku, Tokyo, Japan" should read -- [75] Hiroyuki Nakanishi; Koichi Tanaka,
both of Yokohama; Asao Watanabe,
Higashikurame; Shingo Akiyoshi,
Tokyo, all of Japan --.

Drawings,
Sheet 4, FIG. 3, "CHAIM" should read -- CHIME --.
Sheet 8, FIG. 7A, "MEXT" should read -- NEXT --.

Column 12,
Line 21, "form" should read -- from --.

Signed and Sealed this

Twenty-fourth Day of December, 2002

JAMES E. ROGAN
*Director of the United States Patent and Trademark Office*